(12) United States Patent
Keil et al.

(10) Patent No.: US 8,307,165 B1
(45) Date of Patent: Nov. 6, 2012

(54) SORTING REQUESTS TO THE DRAM FOR HIGH PAGE LOCALITY

(75) Inventors: Shane Keil, Santa Clara, CA (US); John H. Edmondson, Arlington, MA (US); Sean J. Treichler, Sunnyvale, CA (US)

(73) Assignee: Nvidia Corporation, Sanat Clara, CA (US)

( * ) Notice: Subject to any disclaimer, the term of this patent is extended or adjusted under 35 U.S.C. 154(b) by 619 days.

(21) Appl. No.: 12/501,351

(22) Filed: Jul. 10, 2009

(51) Int. Cl.
*G06F 12/00* (2006.01)
*G06F 13/00* (2006.01)

(52) U.S. Cl. ........ 711/141; 711/122; 711/133; 711/134; 711/135; 711/143

(58) Field of Classification Search ............... 711/141, 711/133, 134, 135, 143, 122
See application file for complete search history.

(56) References Cited

U.S. PATENT DOCUMENTS
8,060,700 B1 * 11/2011 Glasco et al. ............... 711/133

OTHER PUBLICATIONS

Eggers, et al. "Simultaneous Multithreading: A Platform for Next-Generation Processors," IEEE Micro, vol. 17, No. 5, pp. 12-19, Sep./Oct. 1997.

* cited by examiner

*Primary Examiner* — Midys Rojas
(74) *Attorney, Agent, or Firm* — Patterson & Sheridan, LLP

(57) ABSTRACT

One embodiment of the invention sets forth a mechanism for increasing the number of read commands or write commands transmitted to an activated bank page in the DRAM. Read requests and dirty notifications are organized in a read request sorter or a dirty notification sorter, respectively, and each sorter includes multiple sets with entries that may be associated with different bank pages in the DRAM. Read requests and dirty notifications are stored in read request lists and dirty notification lists, where each list is associated with a specific bank page. When a bank page is activated to process read requests, read commands associated with read requests stored in a particular read request list are transmitted to the bank page. When a bank page is activated to process dirty notifications, write commands associated with dirty notifications stored in a particular dirty notification list are transmitted to the bank page.

24 Claims, 11 Drawing Sheets

SORTING REQUESTS TO THE DRAM FOR HIGH PAGE LOCALITY

BACKGROUND OF THE INVENTION

1. Field of the Invention

The present invention relates generally to the field of data transmission and, more specifically, to managing conflicts on a shared L2 data bus.

2. Description of the Related Art

One element of a memory subsystem within certain processing units is a Level 2 Cache memory (referred to herein as "L2 cache"). The L2 cache is a large on-chip memory that temporarily stores data being used by the various clients. This data may be retrieved from or written to an external memory (referred to herein as Dynamic Random Access Memory or "DRAM"). A memory controller (referred to herein as "DRAM controller") manages the flow of data being transmitted to or retrieved from the DRAM.

A DRAM typically includes multiple DRAM banks, where each bank is divided into multiple bank pages. A bank page within a DRAM bank needs to be activated before data can be transmitted to or retrieved from that bank page. Only one bank page within a specific DRAM bank can be active at any given clock cycle. After the last data transmission to or data retrieval from a particular bank page is complete, a pre-charge command is transmitted to the DRAM bank, causing the bank page to be closed. Future data transmissions and data retrievals associated with that bank page require the re-activation of that particular bank page. As is well-known, activating and pre-charging bank pages within a DRAM bank are both extremely time consuming operations. Therefore, if either of these two operations is executed too frequently, overall system performance may be severely impacted.

Further, as the need for DRAM operation to become faster increases, the minimum number of data transmissions or data retrievals that need to be executed per bank page activation in order to fully utilize the DRAM bus increases. If the number of data transmissions or data retrievals is less than some minimum threshold number, then clock cycles are wasted on the DRAM bus since data is not transmitted during some clock cycles while the different bank pages are activated. If such a situation occurs too frequently, the overall latency of the system increases due to the excessive number of wasted clock cycles on the DRAM bus.

As the foregoing illustrates, what is needed in the art is an effective mechanism for increasing the number of data transmissions or data retrievals executed when a bank page is activated.

SUMMARY OF THE INVENTION

One embodiment of the present invention sets forth a method for processing read requests and dirty data notifications transmitted by an intermediary cache to frame buffer logic, where a read request relates to retrieving read data from a memory coupled to the frame buffer logic, and a dirty data notification relates to retrieving dirty data from the intermediary cache and transmitting to the memory for storage. The method includes the steps of selecting a request from a first buffer or a second buffer in the frame buffer logic, determining a bank page in the memory related to the selected request, and determining a set of entries in a request sorter related to the bank page, where each entry includes a bank page section, a pointer section and a count section. The method also includes the steps of determining a first entry within the set of entries corresponding to the bank page, transmitting to a request store a pointer from the pointer section of the first entry and a memory address included in the selected request, where the pointer identifies a request list that includes memory addresses from different requests associated with the bank page, and the memory address included in the selected request reflects a location within the bank page where data associated with the selected request should be stored, storing the memory address included in the selected request in the request list, and, when the bank page is activated, transmitting a command corresponding to the memory address included in the selected request to the memory for further processing.

One advantage of the disclosed method is that read requests and dirty data notifications corresponding to a specific bank page are grouped by implementing the read request sorter and dirty data notification sorter. Such a mechanism increases the number of read requests or dirty data notifications processed by the DRAM when a specific bank page is activated, thereby reducing the number of wasted clock cycles on the DRAM bus.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
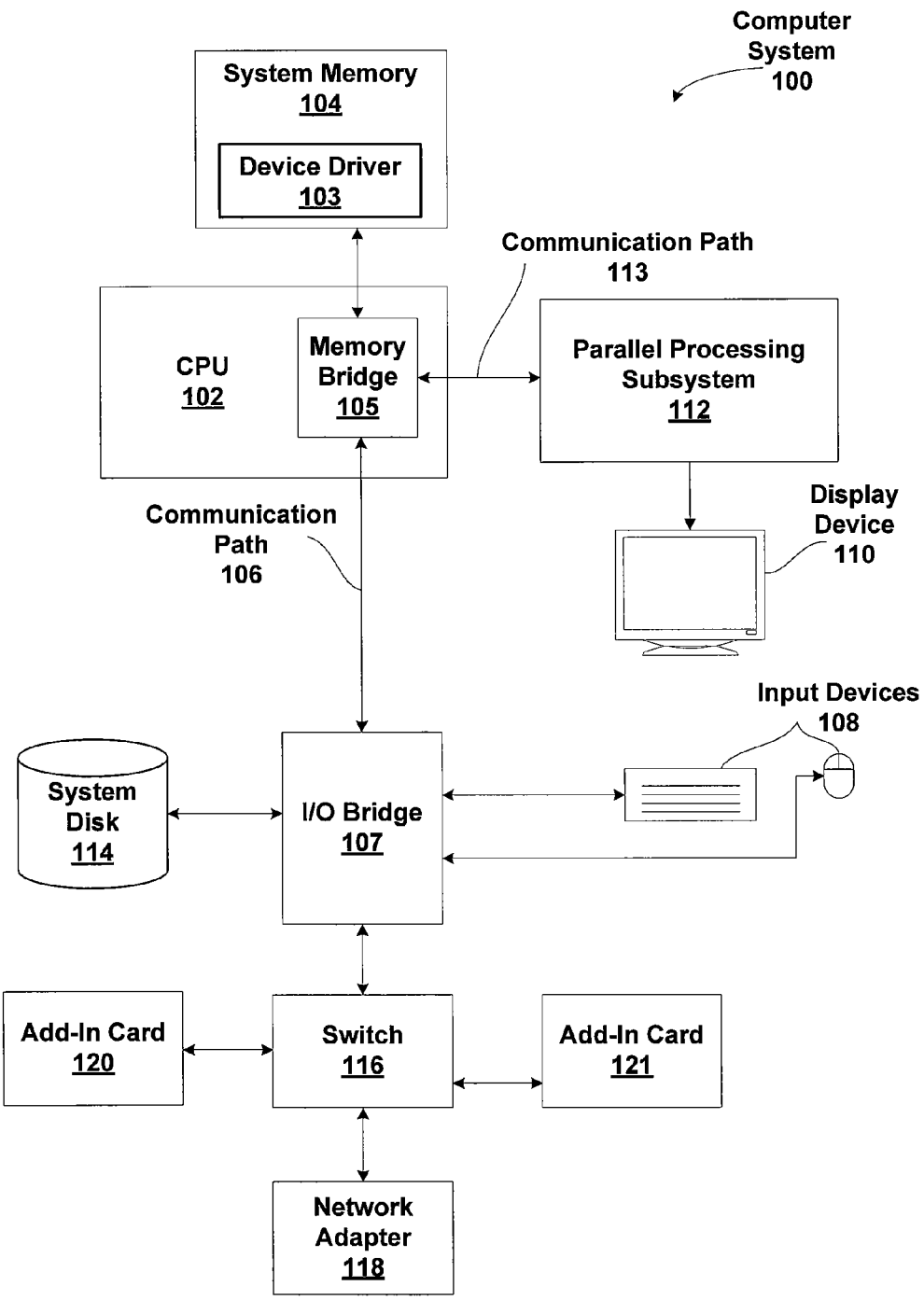
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a peripheral component interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube (CRT) or liquid crystal display (LCD) based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, compact disc (CD) drives, digital versatile disc (DVD) drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
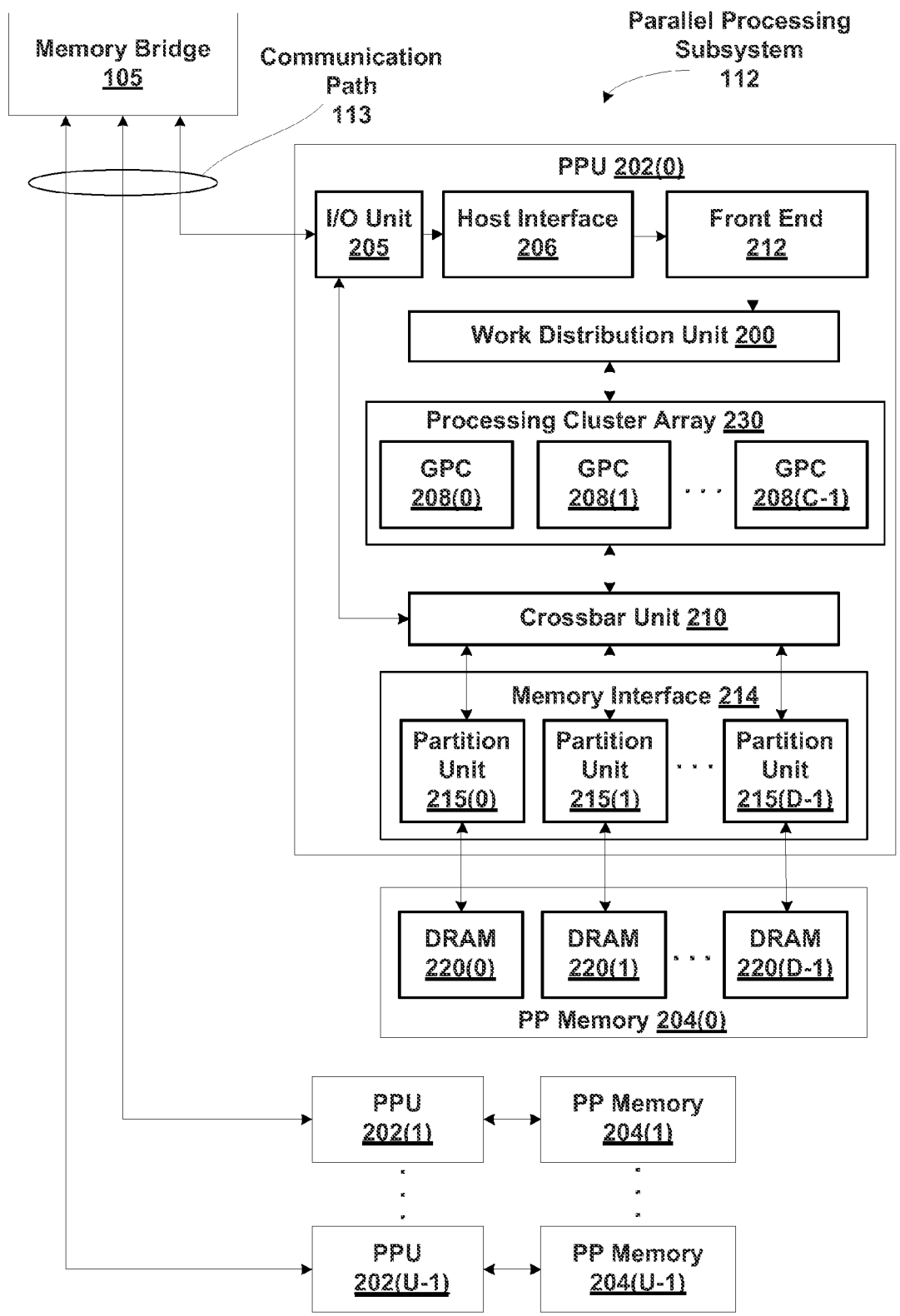
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals)

for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where $D \geq 1$. Each portion of parallel processing memory 204 generally includes one or more memory devices (e.g. DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
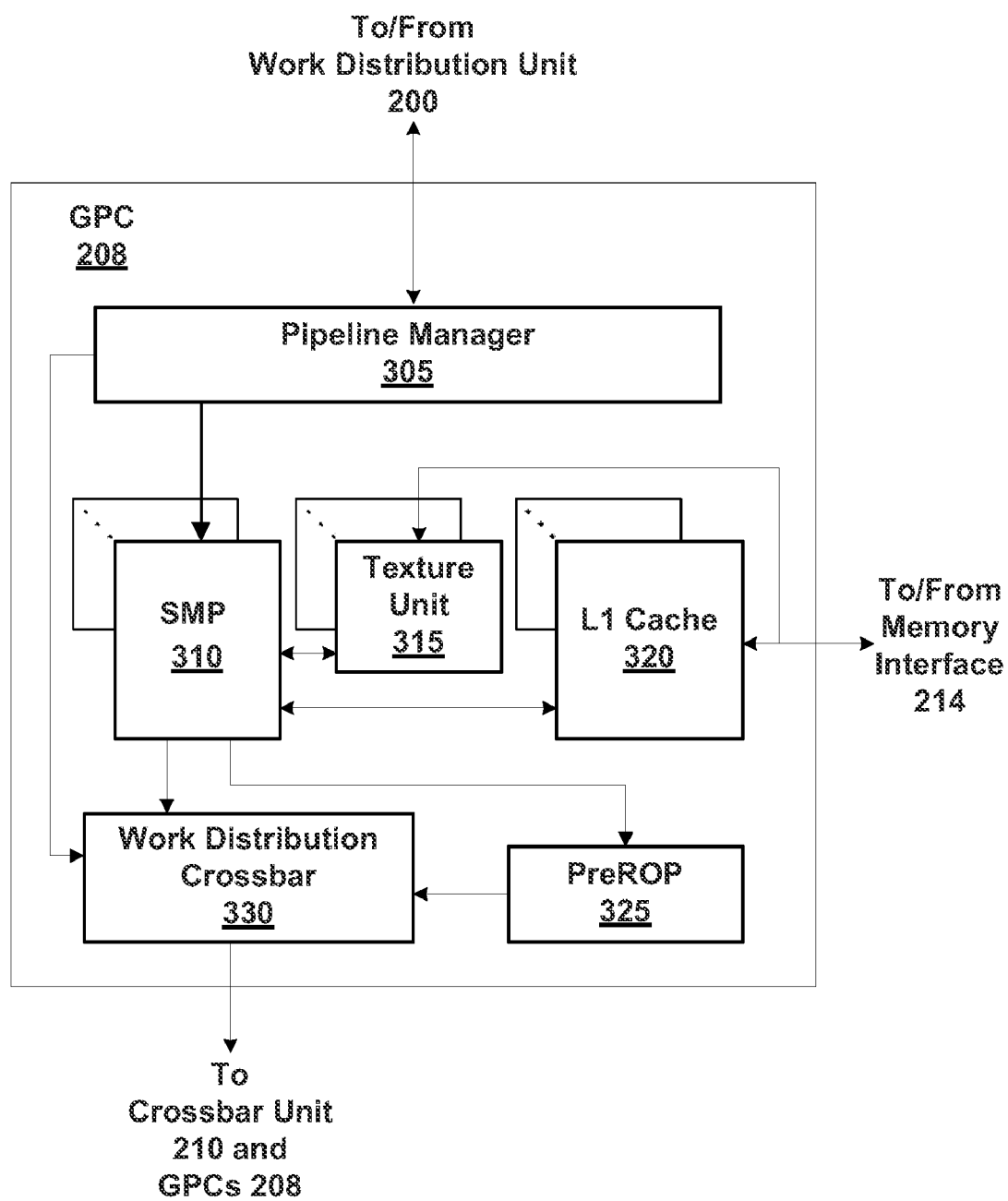
FIG. 3A is a block diagram of a general processing cluster (GPC) within one of the parallel processing units (PPUs) of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SMPs) 310. Pipeline manager 305 may also be configured to control a work distribution crossbar 330 by specifying destinations for processed data output by SMPs 310.

In one embodiment, each GPC 208 includes a number M of SMPs 310, where M≧1, each SMP 310 configured to process one or more thread groups. Also, each SMP 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SMP 310 is referred to herein as a "thread group." As used herein, a "thread group" refers to a group of threads concurrently executing the same program on different input data, with each thread of the group being assigned to a different processing engine within an SMP 310. A thread group may include fewer threads than the number of processing engines within the SMP 310, in which case some processing engines will be idle during cycles when that thread group is being processed. A thread group may also include more threads than the number of processing engines within the SMP 310, in which case processing will take place over multiple clock cycles. Since each SMP 310 can support up to G thread groups concurrently, it follows that up to G×M thread groups can be executing in GPC 208 at any given time.

Additionally, a plurality of related thread groups may be active (in different phases of execution) at the same time within an SMP 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SMP 310, and m is the number of thread groups simultaneously active within the SMP 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SMP 310 uses space in a corresponding L1 cache 320 that is used to perform load and store operations. Each SMP 310 also has access to L2 caches within the partition units 215 that are shared among all GPCs 208 and may be used to transfer data between threads. Finally, SMPs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

In graphics applications, a GPC 208 may be configured such that each SMP 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SMP 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SMP 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines 304, SMPs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
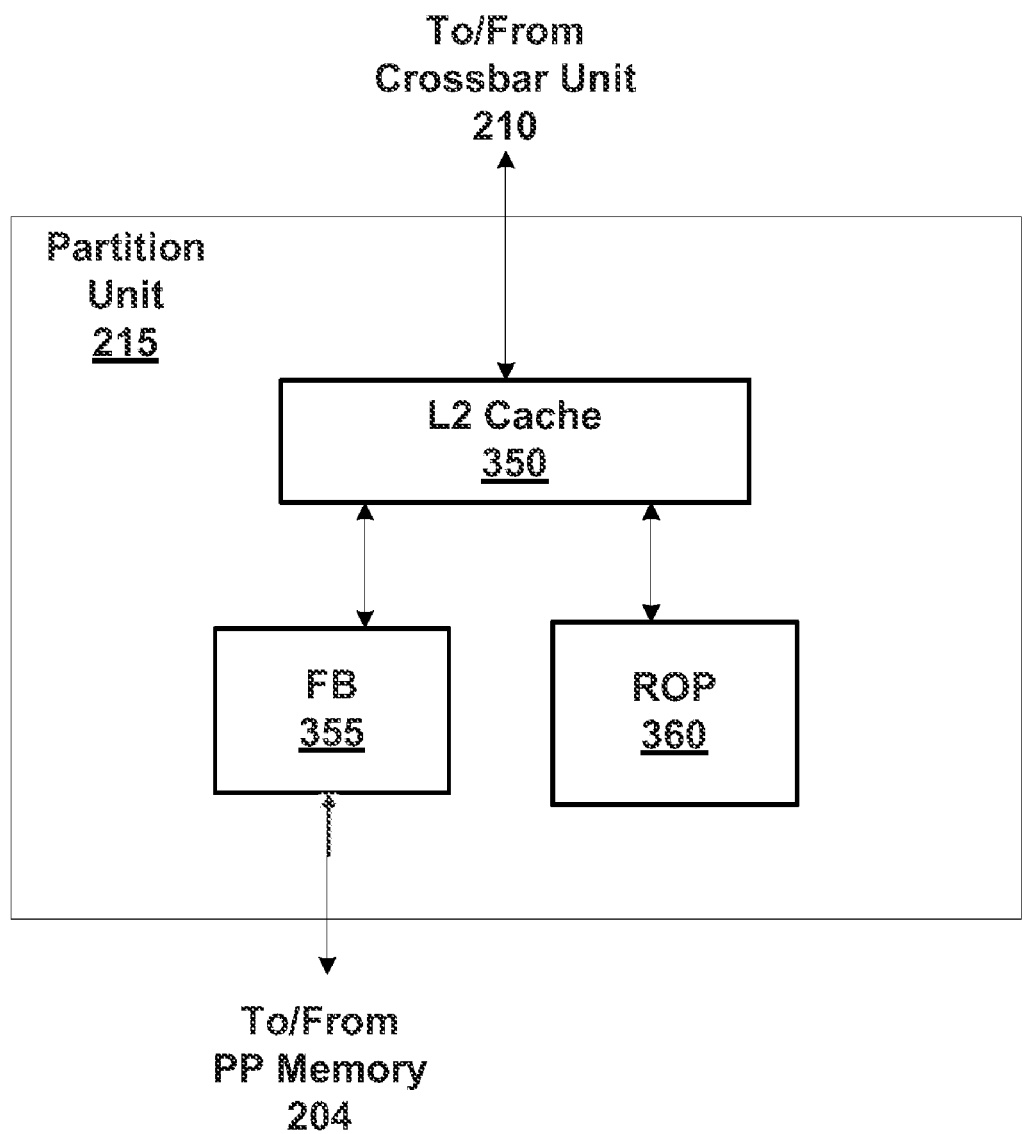
FIG. 3B is a block diagram of a partition unit within one of the PPUs of FIG. 2, according to one embodiment of the present invention.

FIG. 3B is a block diagram of a partition unit 215 within on of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Sorting Read Requests and Dirty Data Notifications for High Bank Page Locality

Figure 4:
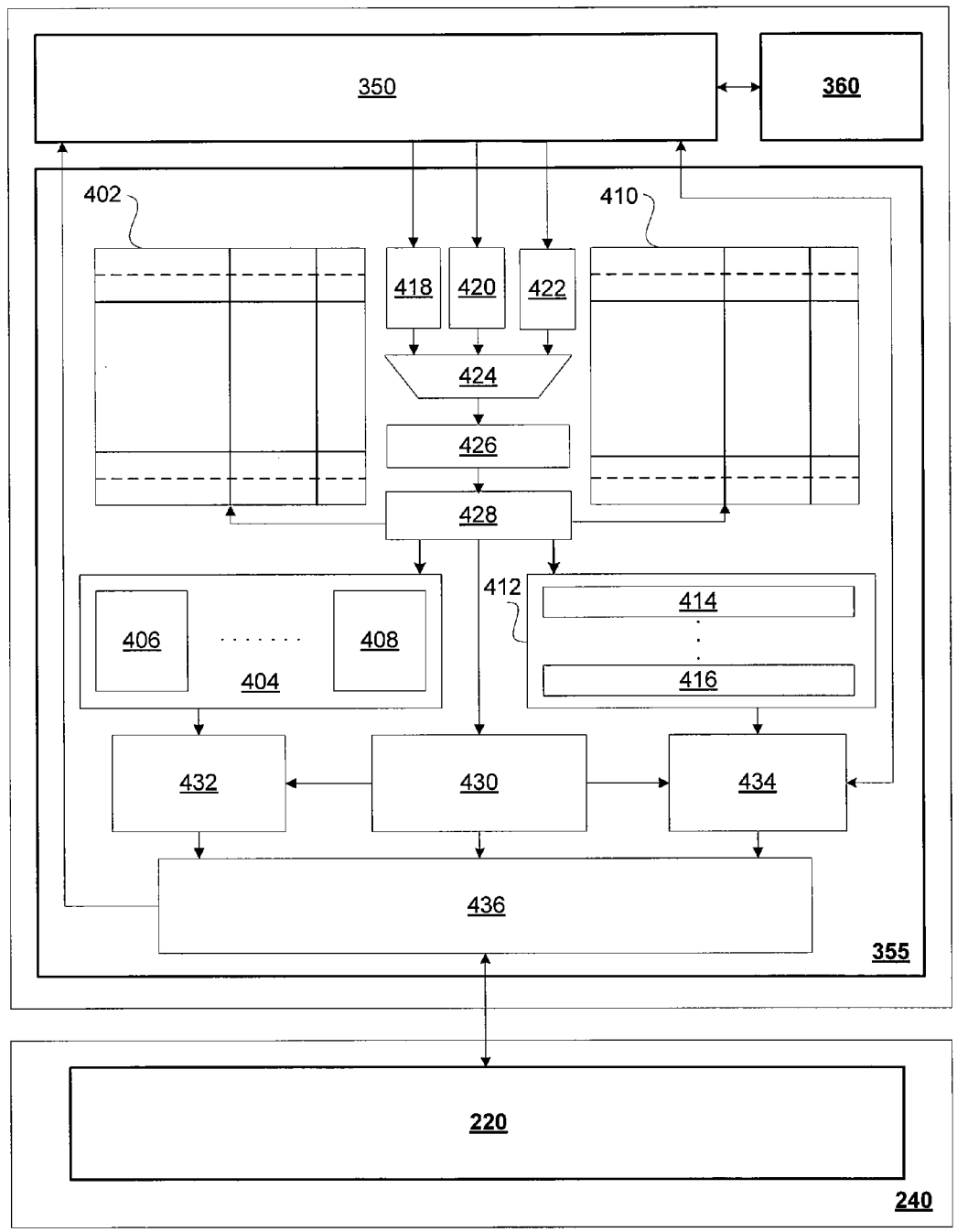
FIG. 4 is a detailed block diagram of the frame buffer logic in the partition unit of FIG. 3B, according to one embodiment of the present invention.

FIG. 4 is a detailed block diagram of the frame buffer logic 355 in the partition 215 unit of FIG. 3B, according to one embodiment of the present invention. As shown, the frame buffer logic 355 includes a read request sorter 402, a read request store 404, a dirty data notification sorter 410, a dirty data notification store 412, a read request buffer 418, a dirty data notification buffer 420, a high-priority clean notification buffer 422, selection arbiter 424, a set calculator 426, an entry updater 428, an activation arbiter 430, a read command arbiter 432, a write command arbiter 434 and a DRAM controller 436.

In operation, the L2 cache 350 receives read and write commands from different clients within the parallel processing subsystem 112, such as the GPCs 208 and the ROP 360. In response to a read command received from a client, the L2 cache 350 transmits the data associated with the read command back to the client. If the data associated with the read command is not stored in the L2 cache 350, then the L2 cache 350 transmits a read request to the frame buffer logic 355 to retrieve the data from the DRAM 220. Each read request received by the frame buffer logic 355 includes a memory address identifying a specific location within a bank page of the DRAM 220 from where the data associated with the read request should be retrieved.

The frame buffer logic 355 implements the read request sorter 402 and the read request store 404 to efficiently sort and store read requests received from the L2 cache 350 based on the bank pages associated with those read requests. The read request store 404 includes read request lists, such as a read request list 406 and a read request list 408, where each read request list stores read requests received by the frame buffer logic 355 corresponding to a specific bank page. The read request sorter 402 is divided into multiple sets, where each set is related to a group of bank pages in the DRAM 220. Each set includes N entries, where each entry may be affirmatively associated with a specific bank page from the group of bank pages related to the set. In one embodiment, there are two entries in each set. An entry in a set includes a bank page section, a pointer section and a count section. If an entry is affirmatively associated with a specific bank page, then the bank page section of that entry stores the bank page number identifying the specific bank page. The pointer section of such an entry stores a pointer to a particular read request list in the read request store 404 that stores the read requests corresponding to the specific bank page. The count section of such an entry reflects the number of read requests stored in the particular read request list at any given time that correspond to the specific bank page.

Read requests received by the frame buffer logic 355 from the L2 cache 350 are stored in the read request buffer 418. The read request buffer 418 is a first-in-first-out buffers that is coupled to the selection arbiter 424. The selection arbiter 424 implements standard arbitration techniques to select read requests from the read request buffer 418 for transmission to the set calculator 426.

When processing a read request received from the selection arbiter 424, the set calculator 426 analyzes the memory address included in the read request to identify the set (referred to herein as the "identified set") in the read request sorter 402 that should include an entry affirmatively associated with the bank page corresponding to the read request (referred to herein as the "affirmatively associated entry"). The set calculator 426 extracts the bank page number from a pre-determined portion of the memory address included in the read request to determine the identified set. The set calculator 426 then transmits the identified set, the extracted bank page number and the memory address included in the read request to the entry updater 428. The entry updater 428 retrieves the entries in the identified set and attempts to match the extracted bank page number with the bank page numbers stored in the bank page sections of the retrieved entries. If the entry updater 428 determines that the bank page section of a retrieved entry matches the extracted bank page number, then that retrieved entry is already affirmatively associated with the extracted bank page. In such a case, the entry updater 428 increments the count in the count section of the affirmatively associated entry.

If the entry updater 428 determines that none of the bank page sections of the retrieved entries matches the extracted bank page, then none of the retrieved entries is affirmatively associated with the extracted bank page number. In such a case, the entry updater 428 affirmatively associates an available entry in the identified set with the extracted bank page number. To affirmatively associate an available entry, the entry updater 428 stores the extracted bank page number in the bank page section of the available entry. The entry updater 428 then initializes a new read request list in the read request store 404 and stores a pointer to the new read request list in the pointer section of the newly affirmatively associated entry in the identified set. Once an available entry in the identified set is affirmatively associated in this fashion, the entry updater 428 transmits an activate command, which includes the extracted bank page number and the pointer stored in the pointer section of the newly affirmatively associated entry, to the activation arbiter 430 for processing, as described in greater detail below. The entry updater 428 also increments the count in the count section of the newly affirmatively associated entry.

After incrementing the count stored in the count section of the affirmatively associated entry in the identified set, the entry updater 428 transmits the pointer stored in the pointer section of the affirmatively associated entry, the count in the count section of the affirmatively associated entry, and the memory address included in the read request to the read request store 404. The read request store 404 updates the read request list identified by the received pointer to store the count and the memory address received from the entry updater 428 in the identified read request list. In this manner, different read requests corresponding to a specific bank page are stored in the same read request list in the read request store 404.

In response to a write command received from a client, the L2 cache 350 stores the data associated with the write command (referred to herein as "dirty data") and transmits a dirty data notification to the frame buffer logic 355 so that a copy of the data can be stored in the DRAM 220. Each dirty data notification received by the frame buffer logic 355 includes a memory address identifying a specific location within a bank page of the DRAM 220 where the dirty data should be stored. At some later clock cycle, the frame buffer logic 355 retrieves the dirty data associated with the dirty data notification from the L2 cache 350 and transmits that dirty data to the DRAM 220 for storage.

The frame buffer logic 355 implements the dirty data notification sorter 410 and the dirty data notification store 412 to efficiently sort and store dirty data notifications received from the L2 cache 350 based on the bank pages associated with those dirty data notifications. The dirty data notification store 412 includes dirty data notification lists, such as a dirty data notification list 414 and a dirty data notification list 416, where each dirty data notification list stores dirty data notifications received by the frame buffer logic corresponding to a specific bank page. The dirty data notification sorter 410 is divided into multiple sets, where each set is related to a group of bank pages in the DRAM 220. Each set includes N entries, where each entry may be affirmatively associated with a specific bank page from the group of bank pages related to the set. In one embodiment, there are two entries in each set. Each entry in a set includes a bank page section, a pointer section and a count section. If an entry is affirmatively associated with a specific bank page, then the bank page section of that entry stores the bank page number identifying the specific bank page. The pointer section of such an entry stores a pointer to a particular dirty data notification list in the dirty data notification store 412 that stores the dirty data notifications corresponding to the specific bank page. The count section of such an entry reflects the number of dirty data notifications stored in the particular dirty data notification list at any given time that correspond to the specific bank page.

A dirty data notification received from the L2 cache 350 is stored in the dirty data notification buffer 420. The dirty data notification buffer is a first-in-first-out buffer that is coupled to the selection arbiter 424. The selection arbiter 424 implements standard arbitration techniques to select dirty data notifications from the dirty data notification buffer 420 for transmission to the set calculator 426.

When processing a dirty data notification received from the selection arbiter 424, the set calculator 426 analyzes the memory address included in the dirty data notification to identify the set (again, referred to herein as the "identified set") in the dirty data notification sorter 410 that should include an entry affirmatively associated with the bank page corresponding to the dirty data notification (again, referred to herein as the "affirmatively associated entry"). The set calculator 426 extracts the bank page number from a pre-determined portion of the memory address included in the dirty data notification to determine the identified set. The set calculator 426 then transmits the identified set, the extracted bank page number and the memory address included in the dirty data notification to the entry updater 428. The entry updater 428 retrieves the entries in the identified set and attempts to match the extracted bank page number with the bank page numbers stored in the bank page sections of the retrieved entries. If the entry updater 428 determines that the bank page section of a retrieved entry matches the extracted bank page number, then that retrieved entry is already affirmatively associated with the extracted bank page. In such a case, the entry updater 428 increments the count in the count section of the retrieved entry affirmatively associated with the extracted bank page.

If the entry updater 428 determines that none of the bank page sections of the retrieves entries matches the extracted bank page, then none of the retrieved entries is affirmatively associated with the extracted bank page number. In such a case, the entry updater 428 affirmatively associates an available entry in the identified set with the extracted bank page number. The entry updater 428 then initializes a new dirty data notification list in the dirty data notification store 412 and stores a pointer to the new dirty data notification list in the pointer section of the newly affirmatively associated entry in the identified set. The entry updater 428 also increments the count in the count section of the newly affirmatively associated entry.

After incrementing the count stored in the count section of the affirmatively associated entry in the identified set, the entry updater 428 transmits the pointer stored in the pointer section of the affirmatively associated entry, the count in the count section of the affirmatively associated entry, and the memory address included in the dirty data notification to the dirty data notification store 412. The dirty data notification store 412 updates the dirty data notification list identified by the received pointer to store the count and the memory address received from the entry updater 428 in the identified dirty data notification list. In this manner, different dirty data notifications corresponding to a specific bank page are stored in the same dirty data notification list in the dirty data notification store 412.

In certain situations where the amount of dirty data stored in the L2 cache 350 and slated to be written to a specific bank page of the DRAM 220 reaches a pre-determined threshold level, the L2 cache 350 transmits a high-priority clean notification to the frame buffer logic 355 to enable at least a portion of that dirty data to be cleaned. The high-priority clean notification includes the bank page number of the specific bank page of the DRAM 220 to where the dirty data is to be written, so that all or a portion of the dirty data can be retrieved from the L2 cache 350 at the earliest possible clock cycle. A high-priority clean notification received from the L2 cache 350 is stored in the high-priority clean notification buffer 422. The high-priority clean notification buffer 422 is a first-in-first-out buffers that is coupled to the selection arbiter 424. The selection arbiter 424 implements standard arbitration techniques to select high-priority clean notifications from the high-priority clean notification buffer 424 for transmission to the set calculator 426.

When processing a high-priority clean notification received from the selection arbiter 424, the set calculator 426 analyzes the bank page number included in the high-priority clean notification to identify the set (again, referred to herein as the "identified set") in the dirty data notification sorter 410 that should include an entry affirmatively associated with the bank page corresponding to the high-priority clean notification (again, referred to herein as the "affirmatively associated bank page"). The set calculator 426 then transmits the identified set and the bank page number included in the high-priority clean notification to the entry updater 428.

The entry updater 428 retrieves the entries in the identified set in the dirty data notification sorter 410 and attempts to match the received bank page number with the bank page numbers stored in the bank page sections of the retrieved entries. As previously described, high-priority clean notifications are transmitted to the frame buffer logic 355 by the L2 cache 350 when the amount of dirty data that is stored in the L2 cache 350 and is slated to be written to a specific bank page of the DRAM 220 reaches a pre-determined threshold level. Because dirty data notifications related to that dirty data have previously been processed by the frame buffer logic 355, an entry in the identified set is already affirmatively associated with the received bank page number. The entry updater 428 selects the retrieved entry where the bank page section of that retrieved entry matches the extracted bank page number. The entry updater 428 then transmits an activate command, which includes the bank page number and the pointer stored in the pointer section of the selected affirmatively associated entry, to the activation arbiter 430.

When the activation arbiter 430 receives an activate commands from the entry updater 428 (in relation to read requests as described in paragraph [0051], or in relation to high-priority clean notification, as described in paragraph [0060]), the activate commands are processed in a first-in-first-out fashion. When processing an activate command, the activation arbiter 430 transmits the bank page number included in the activate command to the DRAM controller 436. The DRAM controller 436 processes the bank page number and causes the specific bank page in the DRAM 220 associated with that bank page number to be activated at some later clock cycle. The activation arbiter 430 also determines the type of the pointer included in the activate command being processed.

If the pointer included in the activate command is a pointer to a read request list, then the activation arbiter 430 transmits the pointer to the read command arbiter 432. The read command arbiter 432 then retrieves the read request list identified by the received pointer and transmits a read command associated with each of the memory addresses included in the read request list to the DRAM controller 436. The DRAM controller 436 then transmits the read commands to the DRAM 220 when the bank page associated with the read commands is activated at some later clock cycle. The DRAM 220 processes the read commands and transmits the data associated with the read commands stored in the activated bank page to the DRAM controller 436 for transmission to the L2 cache 350.

If the pointer included in the activate command is a pointer to a dirty data notification list, then the activation arbiter 430 transmits the pointer to the write command arbiter 434. The write command arbiter 430 then retrieves the dirty data notification list identified by the received pointer and requests dirty data associated with each of the memory addresses stored in the dirty data notification list from the L2 cache 350. Once the dirty data is received, the write command arbiter 434 transmits write commands and dirty data corresponding to each memory address stored in the dirty data notification list to the DRAM controller 436. The DRAM controller 436 then transmits the write commands and dirty data to the DRAM 220 for storage when the bank page associated with the write commands is activated at some later clock cycle.

Persons skilled in the art would recognize that read requests, dirty data notifications and high-priority clean notifications can be processed in parallel. Specifically, the selection arbiter 424, the set calculator 426, and the entry updater 428 can select and process requests/notifications from each of the read request buffer 418, dirty data notification buffer 420 and the high-priority clean notification buffer 422 in a parallel fashion.

In another embodiment, dirty data notifications and high-priority clean notifications may be combined into a single write request. Such a write request is processed in the same fashion as a dirty data notification and a high-priority clean notification.

Figure 5A:
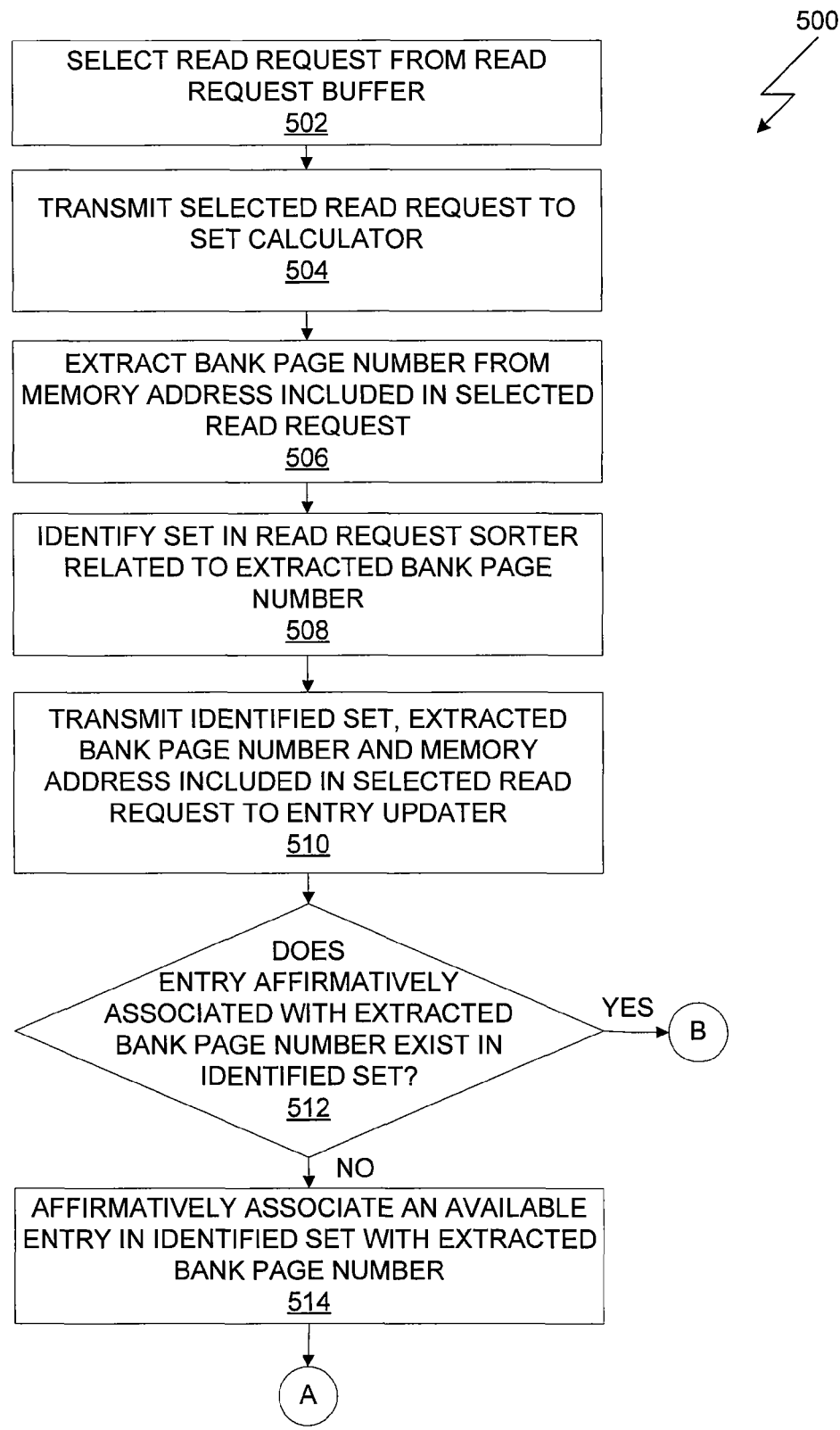
FIGS. 5A and 5B set forth a flow diagram of method steps for storing a read request received from the L2 cache of FIG. 3B, according to one embodiment of the present invention.
Figure 5B:
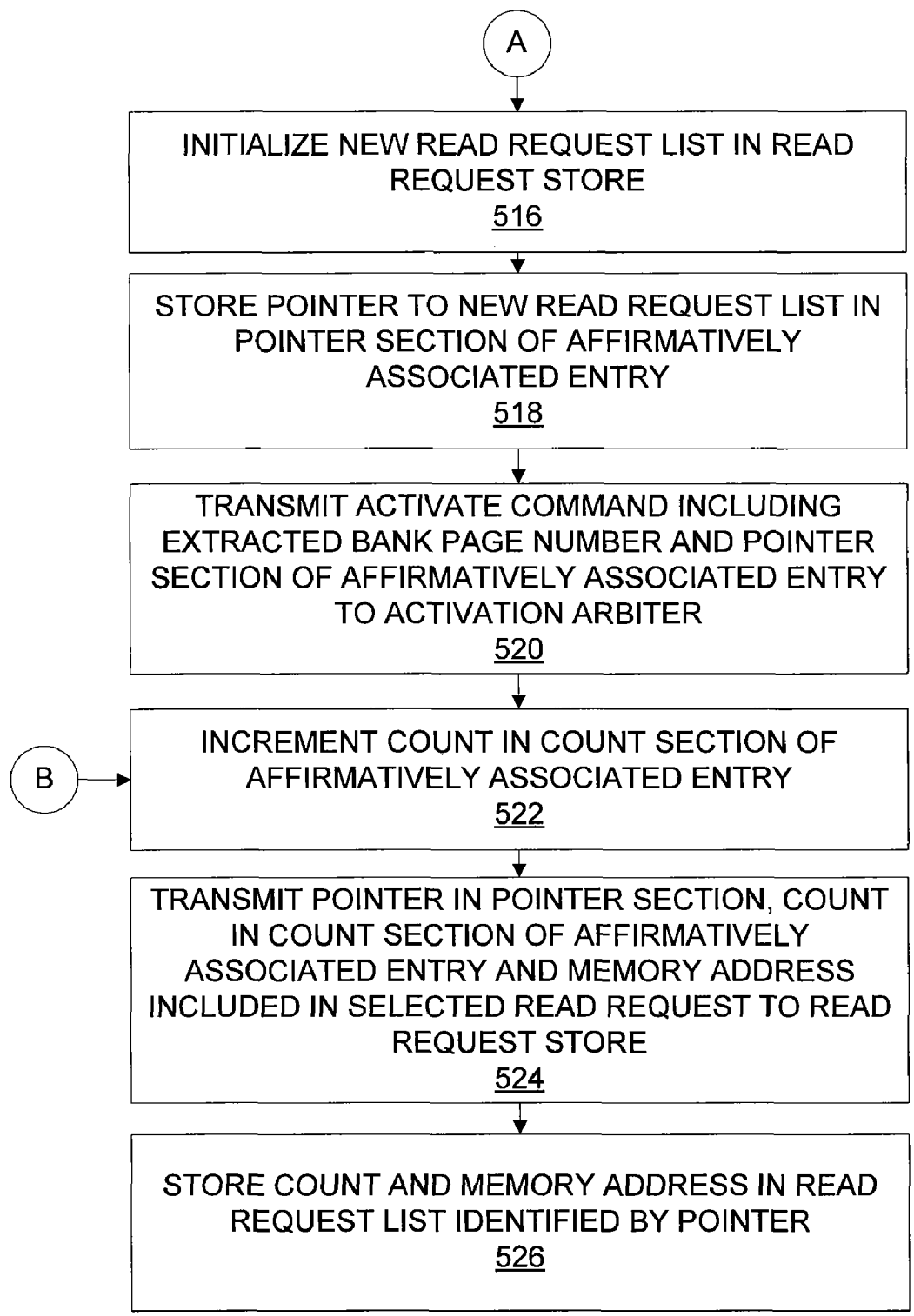

FIGS. 5A and 5B set forth a flow diagram of method steps for storing a read request received from the L2 cache 350 of FIG. 4, according to one embodiment of the present invention. Although the method steps are described in conjunction with FIGS. 1-4, persons skilled in the art will understand that any system configured to perform the method steps, in any order, falls within the scope of the present invention.

The method 500 begins at step 502, where the selection arbiter 424 selects a read request from the read request buffer 418. As described in conjunction with FIG. 4, the arbiter 424 uses standard arbitration techniques to select a read request from a read request buffer 418, a dirty data notification from the dirty data notification buffer 420 or a high-priority clean notification from the high-priority clean notification buffer 422. At step 504, the selection arbiter 424 transmits the selected read request to the set calculator 426. As described in conjunction with FIG. 4, the frame buffer logic 355 implements the read request sorter 402 to sort read requests based on the bank pages in the DRAM 220 corresponding to those read requests. The read request sorter 402 is divided into multiple sets, where each set is related to a group of bank pages in the DRAM 220. At step 506, the set calculator 426 extracts the bank page number from a pre-determined portion of the memory address included in the selected read request that specifies the bank page corresponding to the selected read request.

At step 508, the set calculator 426 identifies the set in the (referred to herein as the "identified set") in the read request sorter 402 that should include an entry affirmatively associated with the bank page corresponding to the read request. At step 510, the set calculator transmits the identified set, the extracted bank page number and the memory address included in the selected read request to the entry updater 428.

At step 512, the entry updater 428 retrieves the entries in the identified set from the read request sorter 402 to determine whether an entry that is affirmatively associated with the extracted bank page (referred to herein as the "affirmatively associated entry") exists in the identified set. The entry updater 428 attempts to match the bank page sections of the retrieved entries with the extracted bank page number. If a match is not found, then none of the entries in the identified set is affirmatively associated with the extracted bank page and the method 500 proceeds to step 514.

At step 514, the entry updater 528 selects an entry in the identified set where the bank page section of the entry is empty, such an entry is available to be affirmatively associated. The entry updater 528 then affirmatively associates the selected entry (referred to herein as the "affirmatively associated entry") with the extracted bank page number. At step 516, the entry updater 428 initializes a new read request list in the read request store 404, and at step 518, the entry updater 428 stores a pointer to the new read request list in the pointer section of the affirmatively associated entry.

At step 520, the entry updater 428 transmits an activate command including the extracted bank page number and the pointer in the pointer section of the affirmatively associated entry to the activation arbiter 430. As described on conjunction with FIG. 4, when an available entry in the identified set in the read request sorter 402 is affirmatively associated, the entry updater 428 transmits an activate command to the activation arbiter 430.

At step 522, the entry updater 428 increments the count in the count section of the affirmatively associated entry. As previously described, the count in the count section of the affirmatively associated entry reflects the number of read requests stored in the read request store 404 at any given time that correspond to the specific bank page corresponding to the affirmatively associated entry. At step 524, the entry updater 428 transmits the pointer in the pointer section and the count in the count section of the affirmatively associated entry and the memory address included in the selected read request to the read request store 404. At step 526, the read request store 404 stores the count and the memory address received from the entry updater 428 in the read request list identified by the pointer received from the entry updater 428.

Referring now back to step 512, if the entry updater 428 determines that the bank page section of one of the retrieved entries matches the extracted bank page, then that retrieved entry is already affirmatively associated with the extracted bank page. In such a case, the method 500 proceeds directly to step 522, previously described herein.

Figure 6A:
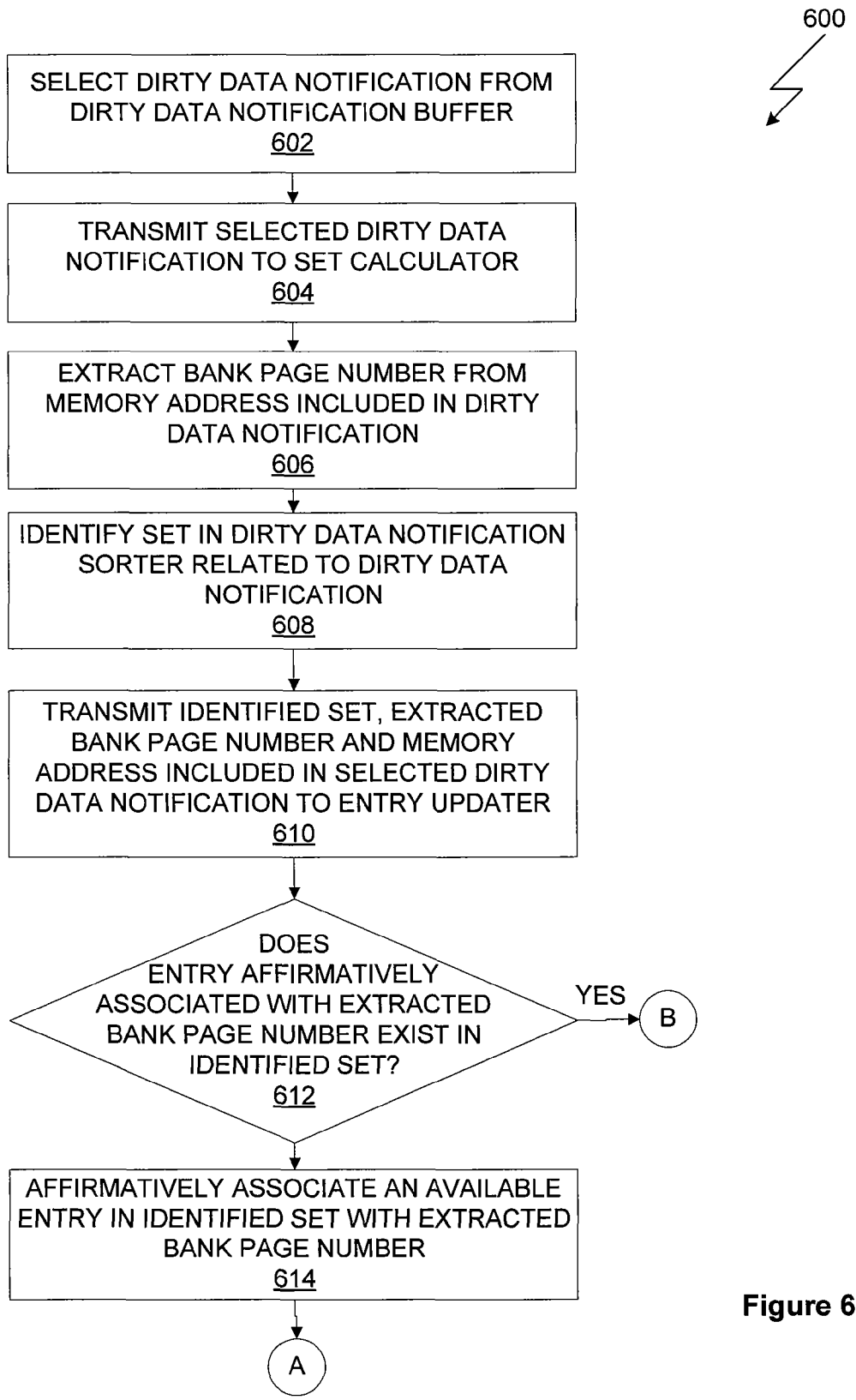
FIGS. 6A and 6B set forth a flow diagram of method steps for storing a dirty data notification received from the L2 cache of FIG. 3B, according to one embodiment of the present invention.
Figure 6B:
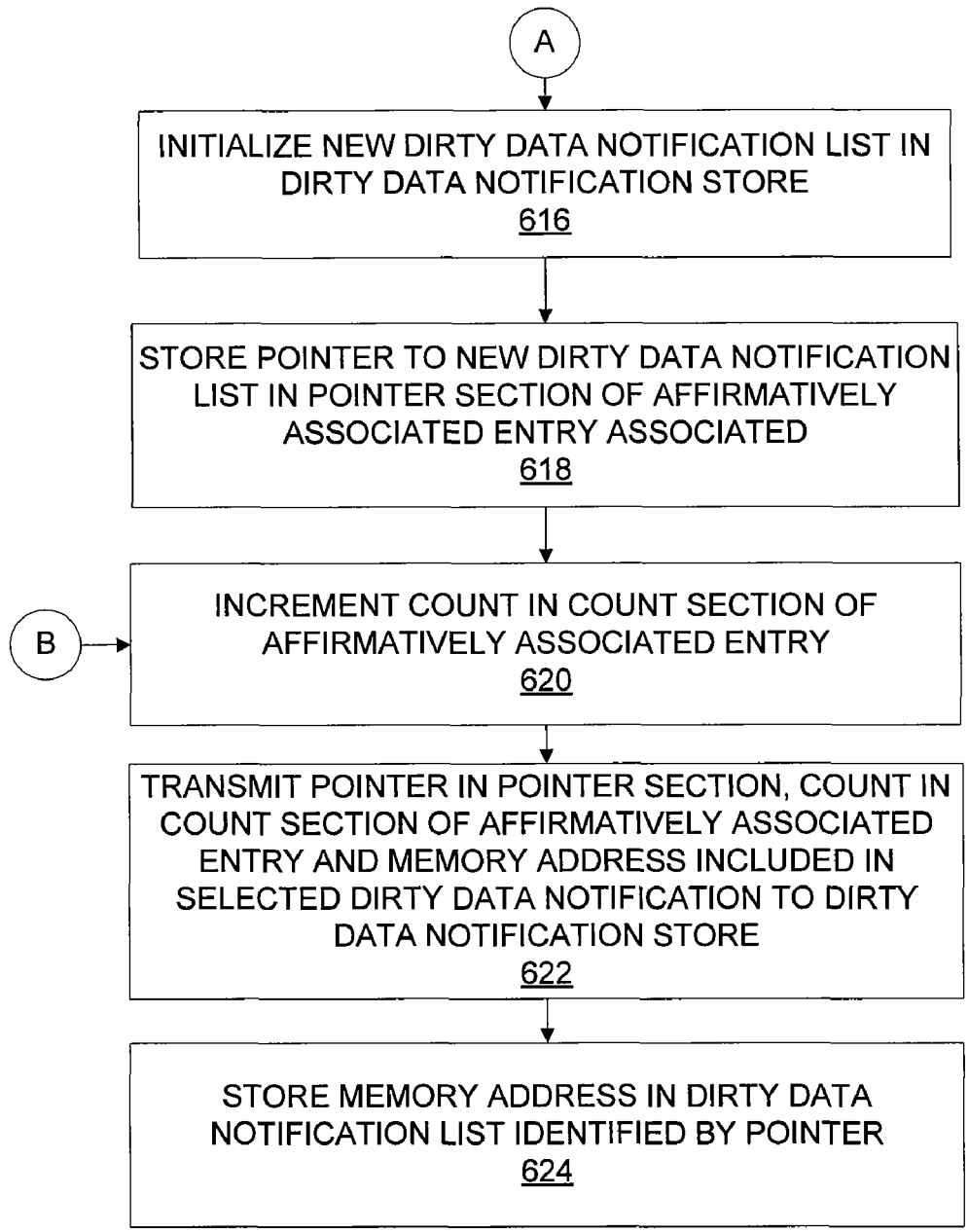

FIGS. 6A and 6B set forth a flow diagram of method steps for storing a dirty data notification received from the L2 cache 350 of FIG. 4, according to one embodiment of the present invention. Although the method steps are described in conjunction with FIGS. 1-4, persons skilled in the art will understand that any system configured to perform the method steps, in any order, falls within the scope of the present invention.

The method 600 begins at step 602, where the selection arbiter 424 selects a dirty data notification from the dirty data notification buffer 420 using standard arbitration techniques. At step 604, the selection arbiter 424 transmits the selected dirty data notification to the set calculator 426. As described in conjunction with FIG. 4, the frame buffer logic 355 implements the dirty data notification store 410 to sort dirty data notifications based on the bank pages in the DRAM 220 corresponding to those dirty data notifications. The dirty data notification store 410 is divided into multiple sets, where each set is related to a group of bank pages in the DRAM 220. At step 606, the set calculator 426 extracts the bank page number from a pre-determined portion of the memory address included in the selected dirty data notification that specifies the bank page corresponding to the selected dirty data notification.

At step 608, the set calculator 426 then identifies the set in the (again, referred to herein as the "identified set") in the dirty data notification store 410 that should include an entry affirmatively associated with the bank page corresponding to the dirty data notification. At step 610, the set calculator transmits the identified set, the extracted bank page number and the memory address included in the selected dirty data notification to the entry updater 428.

At step 612, the entry updater 428 retrieves the entries in the identified set from the dirty data notification store 410 to determine whether an entry that is affirmatively associated with the extracted bank page (referred to herein as the "affirmatively associated entry") exists in the identified set. The entry updater 428 attempts to match the bank page sections of the retrieved entries with the extracted bank page number. If a match is not found, then none of the entries in the identified set is affirmatively associated with the extracted bank page and the method 600 proceeds to step 614.

At step 614, the entry updater 428 selects an entry in the identified set where the bank page section of the entry is empty, such an entry is available to be affirmatively associated. The entry updater 428 then affirmatively associates the selected entry with the extracted bank page number. At step 616, the entry updater 428 initializes a new dirty data notification list in the dirty data notification store 412, and at step 618, the entry updater 428 stores a pointer to the new dirty data notification list in the pointer section of the affirmatively associated entry.

At step 620, the entry updater 428 increments the count in the count section of the affirmatively associated entry. As previously described, the count in the count section of the affirmatively associated entry reflects the number of dirty data notifications stored in the dirty data notification store 412 at any given time that correspond to the specific bank page corresponding to the affirmatively associated entry. At step 622, the entry updater 428 transmits the pointer in the pointer section and the count in the count section of the affirmatively associated entry and the memory address included in the selected and the memory address included in the selected dirty data notification to the dirty data notification store 412. At step 624, the dirty data notification store 412 stores the memory address received from the entry updater 428 in the dirty data notification list identified by the pointer received from the entry updater 428.

Referring now back to step 612, if the entry updater 428 determines that the bank page section of one of the retrieved entries matches the extracted bank page, then that retrieved entry is already affirmatively associated with the extracted bank page. In such a case, the method 600 proceeds directly to step 620, previously described herein.

Figure 7A:
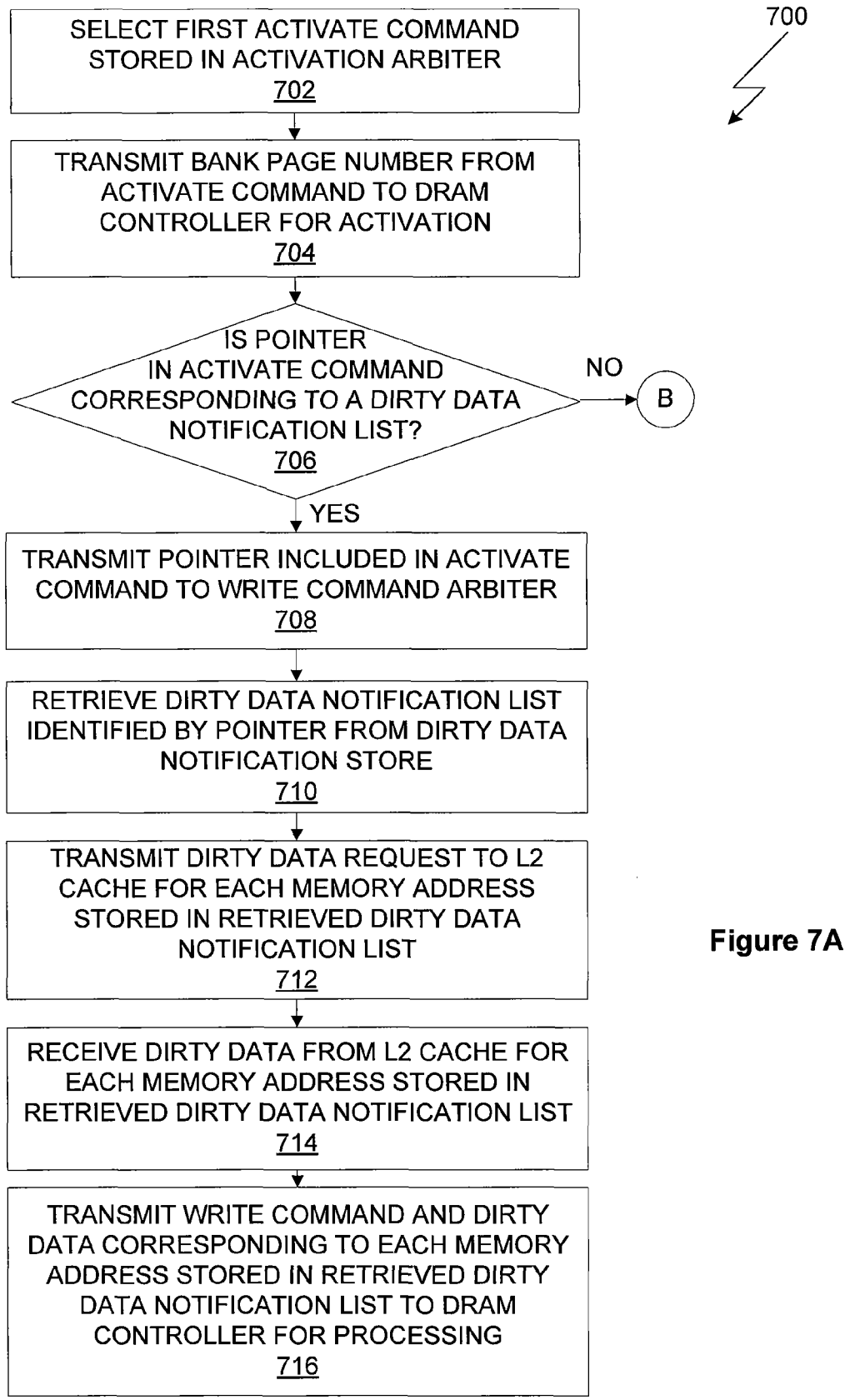
FIGS. 7A and 7B set forth a flow diagram of method steps for transmitting an activate command and corresponding read or write commands to the DRAM of FIG. 2 for processing, according to one embodiment of the present invention.
Figure 7B:
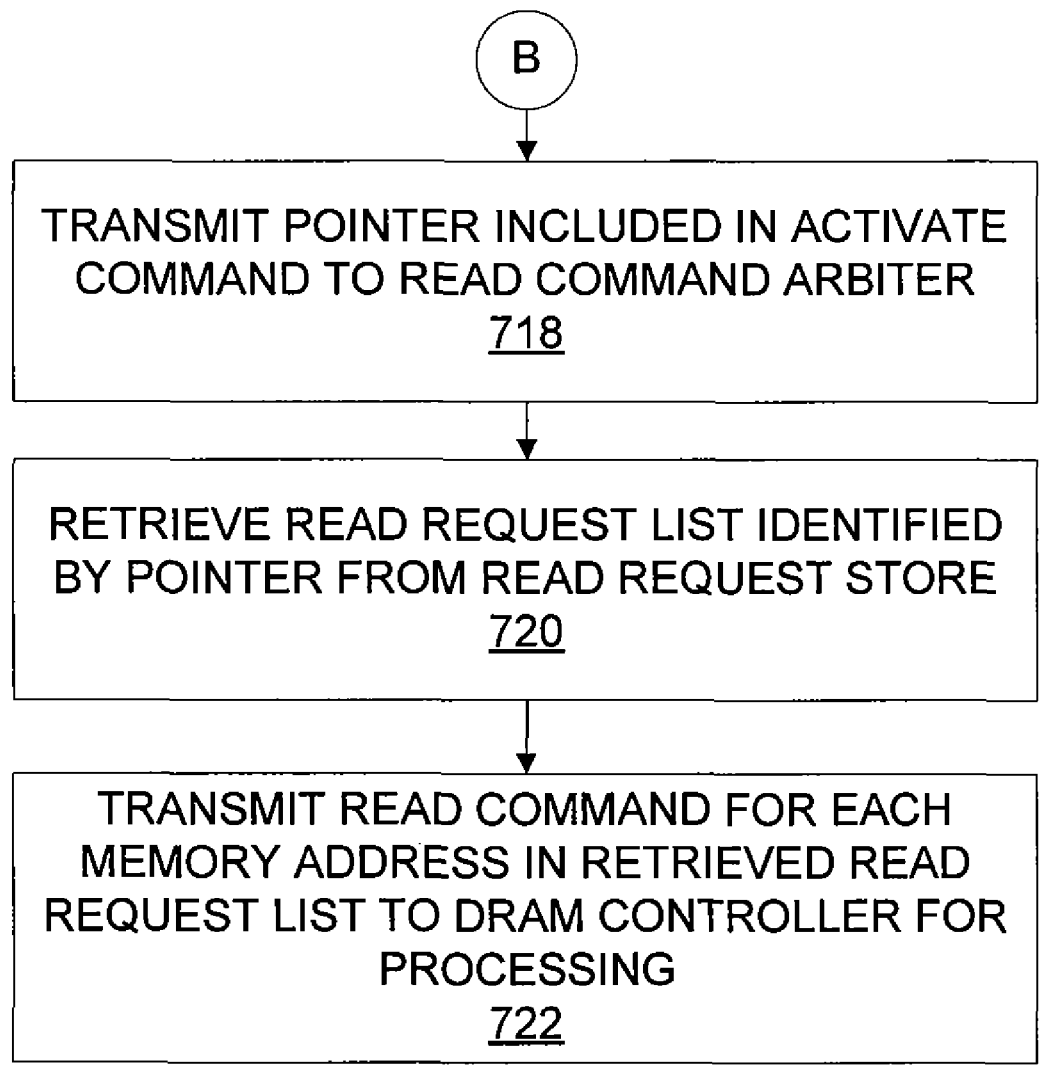

FIGS. 7A and 7B set forth a flow diagram of method steps for transmitting an activate command and corresponding read or write commands to the DRAM 220 of FIG. 2 for processing, according to one embodiment of the present invention. Although the method steps are described in conjunction with FIGS. 1-4, persons skilled in the art will understand that any system configured to perform the method steps, in any order, falls within the scope of the present invention.

The method 700 begins at step 702, where the activation arbiter 430 selects a first activate command stored received from the entry updater 428. At step 704, the activation arbiter 430 transmits the bank page number corresponding to the bank page within the DRAM 220 that needs to be activated and included in the activate command to the DRAM controller 426 for bank page activation. At step 706, the activation arbiter 430 determines whether the pointer included in the activate command is a pointer corresponding to a dirty data notification list. If so, then at step 708, the activation arbiter 430 transmits the pointer included in the activate command to the write command arbiter 434.

At step 710, the write command arbiter 434 retrieves the dirty data notification list stored in the dirty data notification store 412 identified by the pointer received from the activation arbiter 430. At step 712, the write command arbiter 434 transmits a dirty data request to the L2 cache 350 for each memory address stored in the retrieved dirty data notification list requesting the dirty data associated with that memory address. At step 714, the write command arbiter 434 receives the dirty data associated with each memory address included in the retrieved dirty data notification list from the L2 cache 350. At step 716, the write command arbiter 434 transmits a write command and dirty data corresponding to each memory address stored in the retrieved dirty data notification list to the DRAM controller 436 for further processing.

However, if at step 706, the activation arbiter 430 determines that the pointer included in the activate command is a pointer corresponding to a read request list, then the method 700 proceeds to step 718. At step 718, the activation arbiter 430 transmits the pointer included in the activate command to the read command arbiter 432. At step 720, the read command arbiter 432 retrieves the read request list stored in the read request store 404 identified by the pointer received from the activation arbiter 430. At step 722, the read command arbiter 432 transmits a read command corresponding to each memory address stored in the retrieved read request list to the DRAM controller 436 for further processing.

In sum, the frame buffer logic sorts and stores read requests and dirty data notifications received from the L2 cache until read or write commands corresponding to the read requests or dirty data notifications are transmitted to the DRAM for processing. The frame buffer logic implements a read request sorter and a read request store to efficiently sort and store read requests received from the L2 cache based on the bank pages associated with those read requests. Similarly, the frame buffer logic implements a dirty data notification sorter and a dirty data notification store to efficiently sort and store dirty data notifications received from the L2 cache based on the bank pages associated with those dirty data notifications. Each read request and dirty data notification received by the frame buffer logic includes a memory address identifying a specific data block within a bank page of the DRAM where the data associated with that read request or dirty data notification is stored. A set in the read request sorter or the dirty data notification sorter corresponds to a group of bank pages in the DRAM, such that each entry in a set may be affirmatively associated with a specific bank page from that group of bank pages.

When processing a read request received from the L2 cache, the set calculator within the frame buffer logic analyzes the memory address included in the read request to identify the set in the read request sorter that should include an entry affirmatively associated with the bank page corresponding to the read request. The entry updater within the frame buffer logic then extracts the bank page number associated with the bank page corresponding to the read request from the memory address included in the read request. The entry updater determines whether an entry in the identified set is already affirmatively associated with the extracted bank page number.

If the entry updater determines that there is no affirmatively associated entry, then the entry updater affirmatively associates an available entry in the identified set with extracted bank page number by storing the bank page number in the tag section of the entry. The entry updater then initializes a new read request list in the read request store and stores a pointer to the new read request list in the pointer section of the newly affirmatively associated entry in the identified set. The entry updater also increments the count in the count section of the newly affirmatively associated entry. Because the entry is newly affirmatively associated with the extracted bank page number, the entry updater transmits an activate command, which includes the extracted bank page number and the pointer stored in the pointer section of the newly affirmatively associated entry, to the activate arbiter. The entry updater then transmits the pointer to the new read request list, the memory address included in the read request, and the count in the count section of the newly affirmatively associated entry to the read request store. The read request store updates the new read request list identified by the received pointer to store the count and the memory address received from the entry updater.

If the entry updater determines that an entry in the identified set is already affirmatively associated with the extracted bank page number, then the entry updater increments the count in the count section of the entry. The entry updater then transmits the pointer stored in the pointer section of that entry, the memory address included in the read request, and the count in the count section of that entry to the read request store. The read request store updates the read request list identified by the received pointer to store the count and the memory address received from the entry updater.

When processing a dirty data notification received from the L2 cache, the set calculator and the entry updater behave in the same manner as described above when affirmatively associating and updating entries in the dirty data notification sorter. In certain situations where the amount of dirty data that is stored in the L2 cache and is slated to be written to a specific bank page of the DRAM reaches a pre-determined threshold level, the L2 cache transmits a high-priority clean notification to the frame buffer logic to enable at least a portion of that dirty data to be cleaned. The high-priority clean notification includes the bank page number of the specific bank page of the DRAM to where the dirty data is to be written, so that all or a portion of the dirty data can be retrieved from the L2 cache at the earliest possible clock cycle. When processing a high-priority clean notification, the entry updater transmits an activate command, which includes the bank page number and the pointer stored in the pointer section of the entry affirmatively associated with the bank page number, to the activate arbiter.

Upon receiving the activate command, the activate arbiter transmits the bank page number included in the activate command to the DRAM controller for bank page activation. The activate arbiter also transmits the pointer included in the activate command to either the read command arbiter or the write command arbiter based on the type of the pointer. In the former case, the read command arbiter retrieves the read request list identified by the received pointer and transmits a read command associated with each of the memory addresses included in the read request list to the DRAM controller. The DRAM controller then transmits the read commands to the DRAM when the bank page associated with the read commands is activated at some later clock cycle. In the latter case, the write command arbiter retrieves the dirty data notification list identified by the received pointer and requests dirty data associated with each of the memory addresses stored in the dirty data notification list from the L2 cache. Once the dirty data is received, the write command arbiter transmits write commands and dirty data corresponding to each memory address stored in the dirty data notification list to the DRAM controller. The DRAM controller then transmits the write commands and dirty data to the DRAM when the bank page associated with the write commands is activated at some later clock cycle.

One advantage of the disclosed method is that read requests and dirty data notifications corresponding to a specific bank page are grouped by implementing the read request sorter and dirty data notification sorter. Such a mechanism increases the number of read requests or dirty data notifications processed by the DRAM when a specific bank page is activated, thereby reducing the number of wasted clock cycles on the DRAM bus.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for processing read requests and dirty data notifications transmitted by an intermediary cache to frame buffer logic, wherein a read request relates to retrieving read data from a memory coupled to the frame buffer logic, and a dirty data notification relates to retrieving dirty data from the intermediary cache and transmitting to the memory for storage, the method comprising:
    selecting a request from a first buffer or a second buffer in the frame buffer logic;
    determining a bank page in the memory related to the selected request;
    determining a set of entries in a request sorter related to the bank page, wherein each entry includes a bank page section, a pointer section and a count section;
    determining a first entry within the set of entries corresponding to the bank page;
    transmitting to a request store a pointer from the pointer section of the first entry and a memory address included in the selected request, wherein the pointer identifies a request list that includes memory addresses from different requests associated with the bank page, and the memory address included in the selected request reflects a location within the bank page where data associated with the selected request should be stored;
    storing the memory address included in the selected request in the request list; and
    when the bank page is activated, transmitting a command corresponding to the memory address included in the selected request to the memory for further processing.

2. The method of claim 1, wherein the step of determining the bank page comprises the step of extracting a bank page number from a pre-determined portion of the memory address included in the selected request.

3. The method of claim 2, wherein the step of determining the first entry within the set of entries comprises the step of determining that the bank page number matches the bank page section of the first entry.

4. The method of claim 2, wherein the step of determining the first entry within the set of entries comprises the steps of determining that the bank page number does not match the bank page section of any of the entries within the set of entries, and affirmatively associating the first entry with the bank page by storing the bank page number in the bank page section of the first entry.

5. The method of claim 4, wherein the step of transmitting to the request store comprises the steps of initializing the request list in the request store, and storing the pointer in the pointer section of the first entry.

6. The method of claim 5, wherein the selected request is a read request selected from the first buffer, and the step of determining the first entry within the set of entries further comprises the step of transmitting an activate command to an activation arbiter in the frame buffer logic, wherein the activate command includes the bank page number and the pointer.

7. The method of claim 6, wherein the step of transmitting the command comprises the steps of transmitting the bank page number in the activate command to a controller in the frame buffer logic for bank page activation, and transmitting the pointer to the request store for processing.

8. The method of claim 7, wherein the command is a read command, and the step of transmitting the command further comprises the steps of retrieving the request list from the request store and transmitting the read command to the controller.

9. The method of claim 5, wherein the selected request is a dirty data notification selected from the second buffer, further comprising the step of transmitting an activate command to an activation arbiter when a high-priority clean notification associated with the bank page is received from the intermediary cache, wherein the activate command includes the bank page number and the pointer.

10. The method of claim 9, wherein the step of transmitting the command comprises the steps of transmitting the bank page number in the activate command to a controller in the frame buffer logic for bank page activation, and transmitting the pointer to the request store for processing.

11. The method of claim 10, wherein the command is a write command, and the step of transmitting the command further comprises the steps of retrieving the request list from the request store, receiving the data associated with the selected request from the intermediary cache, and transmitting the write command and the data associated with the selected request to the controller.

12. The method of claim 5, wherein the selected request is a dirty data notification that includes a high-priority clean notification selected from the second buffer, further comprising the step of transmitting an activate command to an activation arbiter, wherein the activate command includes the bank page number and the pointer.

13. A system configured for scheduling processing read requests and dirty data notifications, the system comprising:
    an intermediary cache configured to store data and coupled to one or more clients; and
    frame buffer logic coupled to the intermediary cache and to a memory and configured to retrieve read data from the memory and transmit the read data to the intermediary cache and to transmit data from the intermediary cache to the memory, wherein the frame buffer logic includes:
        a first buffer configured to store requests received from the intermediary cache,
        a second buffer configured to store requests received from the intermediary cache,
        a selection arbiter configured to select a request from the first buffer or the second buffer,
        a request sorter configured with one or more sets of entries, wherein each entry includes a bank page section, a pointer section and a count section, a request store that includes one or more request lists and is configured to store a memory address included in the selected request in a first of the one or more request lists, a set calculator configured to:
  determine a bank page in the memory corresponding to the selected request, and
  determine a set of entries in the request sorter related to the bank page, an entry updater configured to:
  determine a first entry within the set of entries related to the bank page, and
  transmit to the request store a pointer from the pointer section of the first entry and a memory address included in the selected request, wherein the pointer identifies the first request list, and the memory address included in the selected request reflects a location within the bank page where data associated with the selected request should be stored, and a controller configured to, when the bank page is activated, transmit a command corresponding to the memory address included in the selected request to the memory for further processing.

14. The system of claim 13, wherein the entry updater is configured to determine the bank page by extracting a bank page number from a pre-determined portion of the memory address included in the selected request.

15. The system of claim 14, wherein the entry updater is configured to determine the first entry within the set of entries by determining that the bank page number matches the bank page section of the first entry.

16. The system of claim 14, wherein the entry updater is configured to determine the first entry by determining that the bank page number does not match the bank page section of any of the entries within the set of entries, and affirmatively associating the first entry with the bank page by storing the bank page number in the bank page section of the first entry.

17. The system of claim 16, wherein the entry updater is configured to transmit to the request store by initializing the first request list in the request store, and storing the pointer in the pointer section of the first entry.

18. The system of claim 17, the frame buffer logic further comprising an activation arbiter configured to receive an activate command from the entry updater when the selected request is a read request selected by the selection arbiter from the first buffer, wherein the activate command includes the bank page number and the pointer.

19. The system of claim 18, wherein the activation arbiter is further configured to transmit the bank page number included in the activate command to the controller and to transmit the pointer included in the activate command to a read request arbiter in the frame buffer logic for further processing.

20. The system of claim 19, wherein the command is a read command, and the read request arbiter is configured to retrieve the first request list from the request store and transmit the read command to the controller.

21. The system of claim 13, the frame buffer logic further comprising an activation arbiter configured to receive an activate command from the entry updater when a high-priority clean notification is received by the entry updater, wherein the activate command includes the bank page number and the pointer.

22. The system of claim 21, wherein the activation arbiter is further configured to transmit the bank page number included in the activate command to the controller and to transmit the pointer included in the activate command to a dirty data notification arbiter for further processing.

23. The method of claim 21, wherein the command is a write command, and the dirty data notification arbiter is configured retrieve the first request list from the request store, retrieve the data associated with the selected request from the intermediary cache, and transmit the write command and the data associated with the selected request to the controller.

24. A computing device, comprising:
  one or more clients;
  an intermediary cache;
  a crossbar unit that couples the one or more clients to the intermediary cache;
  frame buffer logic coupled to the intermediary cache and to a memory;
  wherein the intermediary cache is configured to receive a read command from the one or more clients and to transmit a read request associated with the read command to the frame buffer logic, and to receive a write command and write data associated with the write command from the one or more clients and to transmit a dirty data notification associated with the write command and the write data to the frame buffer logic,
  wherein the frame buffer logic is configured to process a read request by retrieving read data from the memory and transmit the read data to the intermediary cache, and to process a dirty data notification by transmitting data from the intermediary cache to the memory, and the frame buffer logic includes:
    a first buffer configured to store requests received from the intermediary cache,
    a second buffer configured to store requests received from the intermediary cache,
    a selection arbiter configured to select a request from the first buffer or the second buffer,
    a request sorter configured with one or more sets of entries, wherein each entry includes a bank page section, a pointer section and a count section,
    a request store that includes one or more request lists and is configured to store a memory address included in the selected request in a first of the one or more request lists,
    a set calculator configured to:
      determine a bank page in the memory corresponding to the selected request, and
      determine a set of entries in the request sorter related to the bank page,
    an entry updater configured to:
      determine a first entry within the set of entries related to the bank page, and
      transmit to the request store a pointer from the pointer section of the first entry and a memory address included in the selected request, wherein the pointer identifies the first request list, and the memory address included in the selected request reflects a location within the bank page where data associated with the selected request should be stored, and
    a controller configured to, when the bank page is activated, transmit a command corresponding to the memory address included in the selected request to the memory for further processing.

* * * * *